United States Patent [19]

Schluger

[11] Patent Number: 5,230,464
[45] Date of Patent: Jul. 27, 1993

[54] TRANSMITTAL PACKAGE

[76] Inventor: Allen Schluger, 21 W. 68th St., New York, N.Y. 10023

[21] Appl. No.: 987,774

[22] Filed: Dec. 9, 1992

[51] Int. Cl.⁵ .............................................. B65D 65/12
[52] U.S. Cl. .................................. 229/300; 206/232; 229/305
[58] Field of Search ..................... 206/232, 444, 459.5, 206/497; 229/68 R, 69, 300–306

[56] References Cited

U.S. PATENT DOCUMENTS

| 1,762,084 | 6/1930 | Snyder | 229/306 |
| 2,874,892 | 2/1959 | Howard | 229/301 |
| 2,907,514 | 10/1959 | Bermingham, Jr. et al. | 229/306 |
| 2,983,431 | 5/1961 | Turan | 229/306 |
| 3,497,132 | 2/1970 | Henry | 229/69 |
| 3,899,381 | 8/1975 | O'Brien et al. | 229/300 |
| 4,905,831 | 3/1990 | Bagdis et al. | 206/444 |

Primary Examiner—Jimmy G. Foster

[57] ABSTRACT

A two-ply construction in a product transmittal package having a removable compartment for the product in which removal is facilitated by lines of perforations in one ply in alignment with a cooperating slot in the other ply, so that rupture of the perforations and not also the construction material of a ply is all that is necessary to separate the compartment from the package.

1 Claim, 3 Drawing Sheets

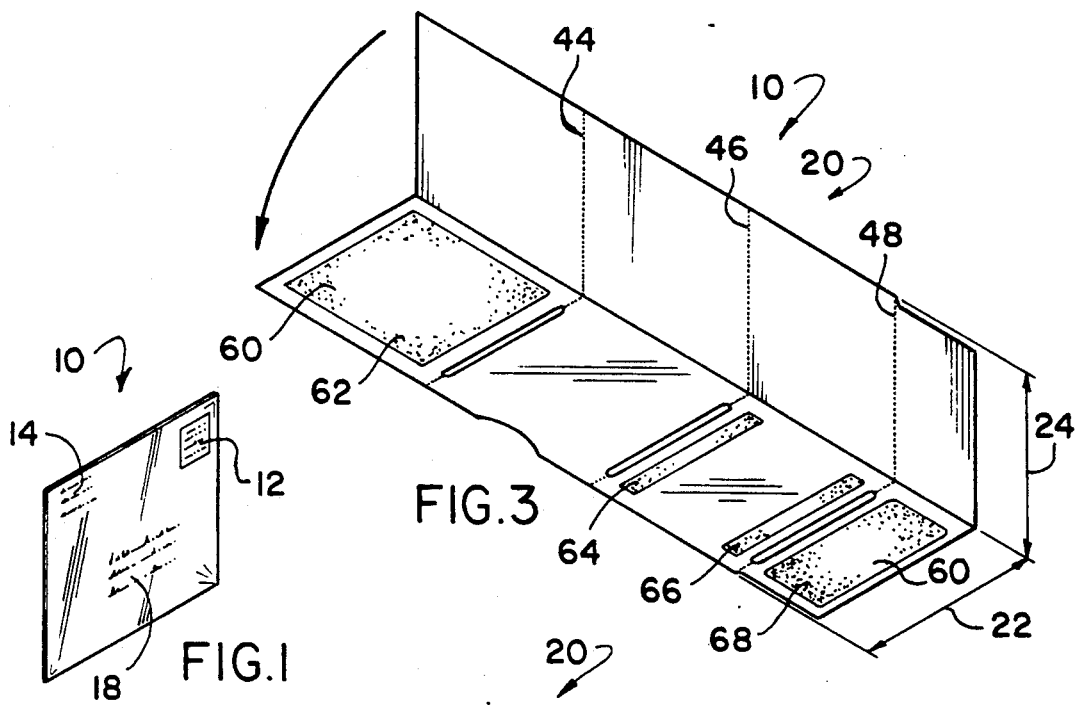
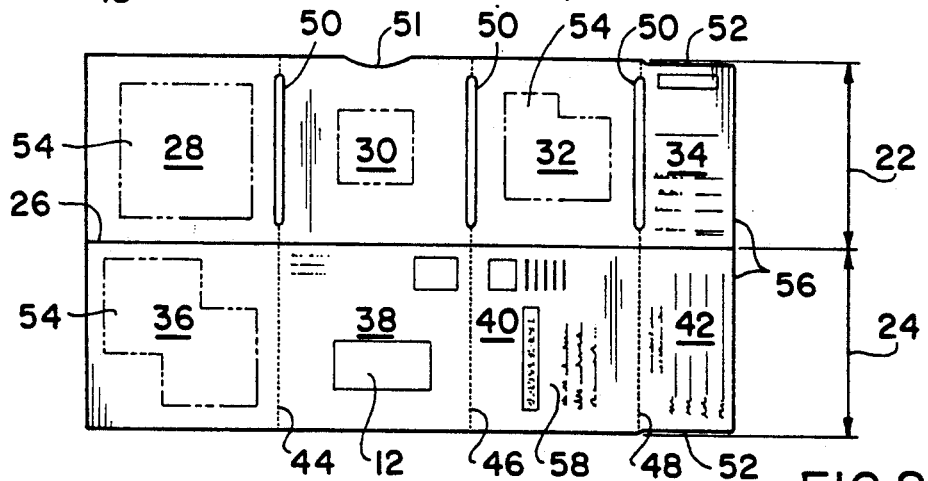
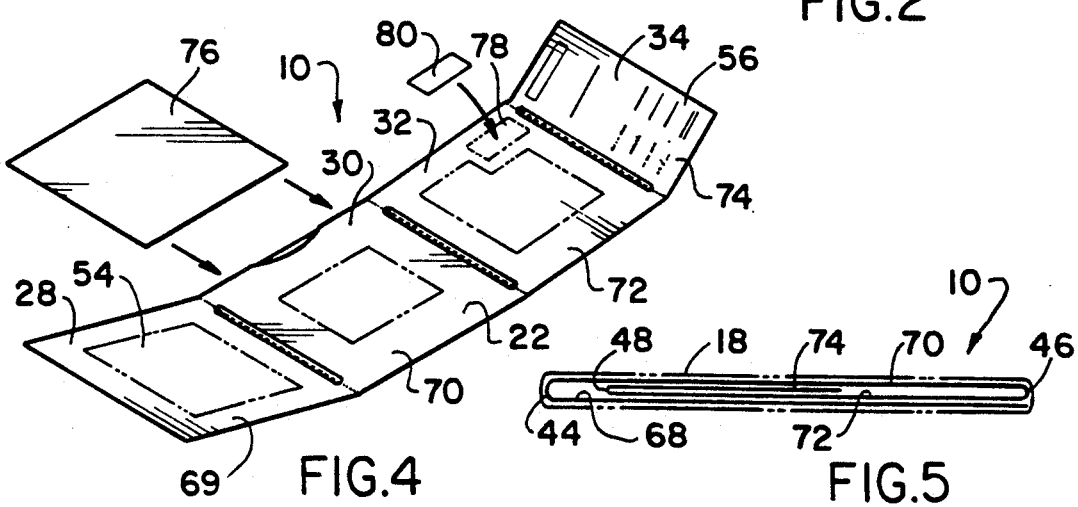

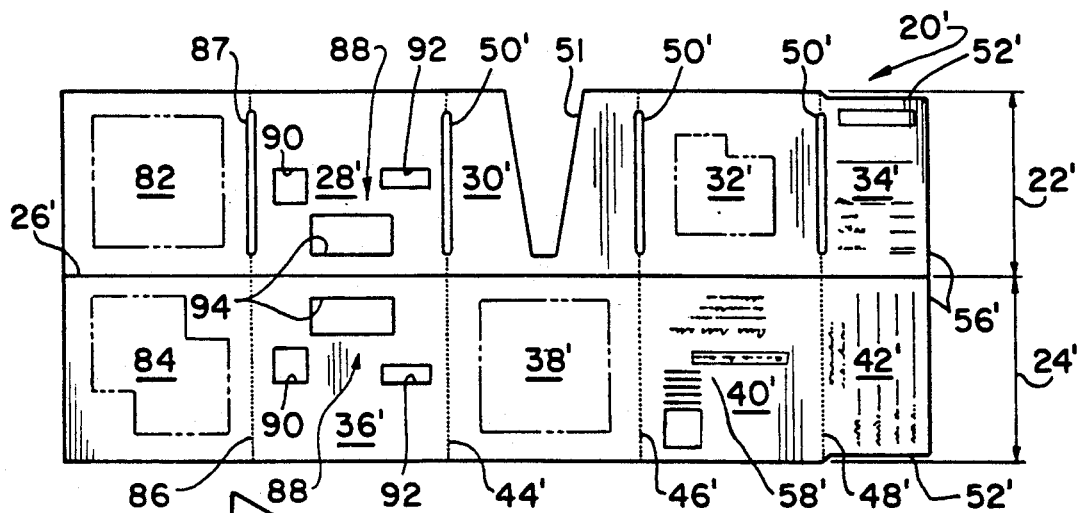
FIG.6
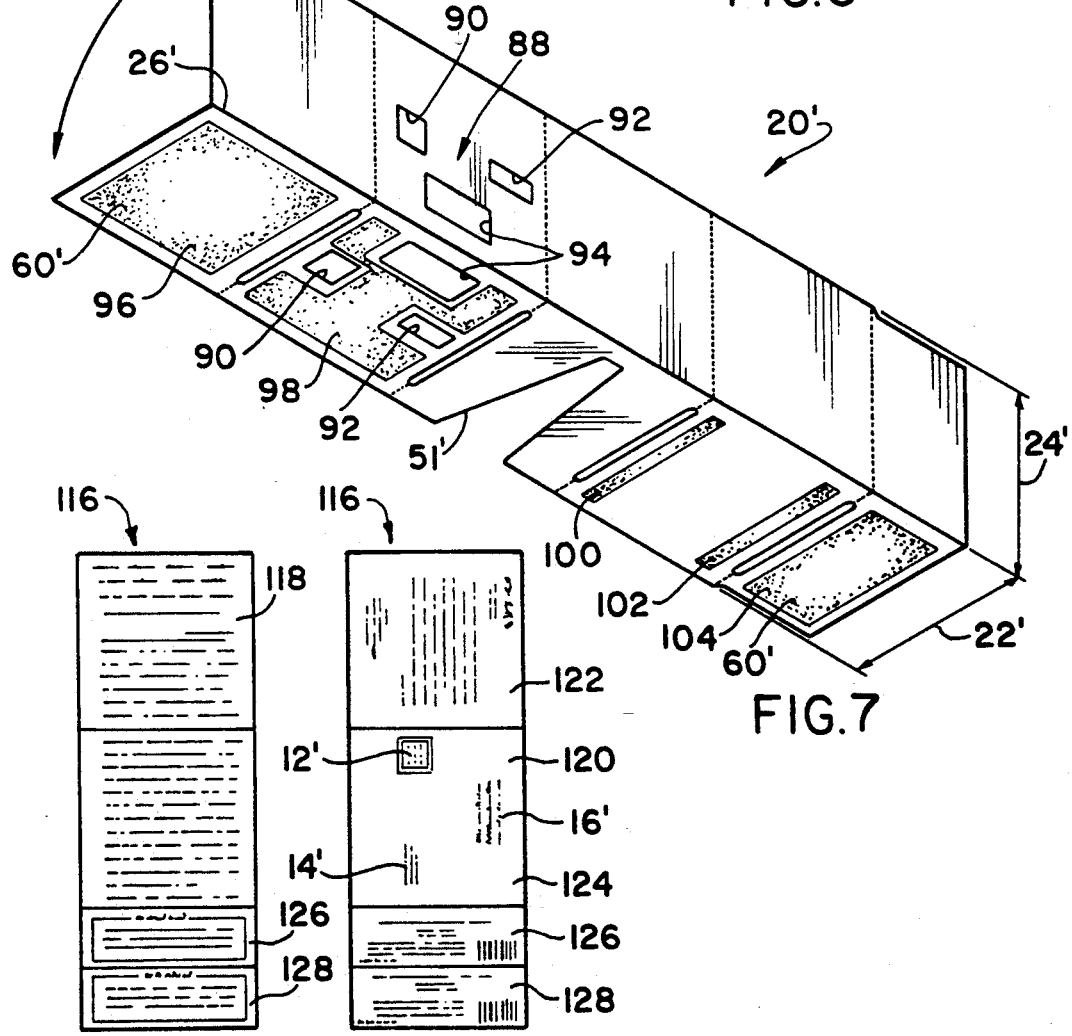
FIG.7
FIG.9  FIG.10

TRANSMITTAL PACKAGE

The present invention relates generally to improvements in a package used for transmitting via the mails a sample product or product-solicitation disc or the like to a prospective customer, which contemplates as a response by the customer-recipient the return of an order form.

In such known transmittal packages as exemplified by the transmittal package of prior U.S. Pat. No. 4,905,831, it is desirable for protection against damage of the product sample (or disc) being transmitted, and of the order form being returned, to use compartments bounded between two plies of construction material. Heretofore, however, providing a two-ply compartment complicates its ready detachment from the transmittal package, and yet detachment is unavoidably necessary to enable the recipient to maintain possession of the product being sampled and to return the order form.

EXAMPLE OF THE PRIOR ART

In the above noted U.S. Pat. No. 4,905,831 issued to Bagdis on Mar. 6, 1990, the transmittal package described and illustrated therein contemplates removal from its construction of a portion that can effectively serve as a storage compartment for the article of manufacture that is transmitted to a prospective user. Thus, in the Bagdis patent, the transmittal package is provided with lines of perforations 30c and 30d which permit the removal of a panel 30 having opposing flaps 72 which respectively fold down from the top and up from the bottom against a diskette, the article of manufacture being transmitted, and thus the two flaps 72 hold the diskette against the underlying panel 30.

The compartment as above described provided by the flaps 72 is only partially satisfactory since it is preferred that, instead of mere flaps, the storage compartment in the transmittal package be formed by coextensive front and rear panels which define a storage compartment between them. However, to provide this preferred construction in a storage compartment introduces two plies in the construction of the package and, thus, complicates its removal from the package. It would, for example, require two lines of perforations which align with each other at each separation if one follows the teachings of Bagdis. Alternatively, the perforation lines can be imparted to the completed transmittal package, but this would complicate and increase the cost of preparing the transmittal package.

It is an object of the present invention to provide, in accordance with the teachings of the present invention, a storage compartment in a transmittal package, which consists of a preferred construction in which the compartment has front and rear panels in superimposed relation to each other which define therebetween the storage compartment and which provide lines of perforation for separation of this compartment from the package in a manner which obviates the shortcomings of the prior art.

The description of the invention which follows, together with the accompanying drawings, should not be construed as limiting the invention to the example shown and described, because those skilled in the art to which this invention appertains will be able to devise other forms thereof within the ambit of the appended claims.

FIG. 1 is perspective view of an assembled first embodiment of a transmittal package or packet of the present invention;

FIG. 2 is plan view showing in the flat the packet blank after the printing and the die-cutting thereof, and with the printed side being displayed;

FIG. 3 is a perspective view showing a intermediate stage of assembly of the blank;

FIG. 4 is a perspective view showing the final assembly of the blank resulting in the contemplated packet or transmittal package of FIG. 1;

FIG. 5 is a schematic end elevational view of the packet of FIG. 1;

FIG. 6 is a view similar to FIG. 2 but of a second embodiment of the packet of the present invention;

FIG. 7 is a perspective view showing, like FIG. 3, a similar intermediate stage of assembly of the blank of FIG. 6;

FIGS. 9 and 10 are views showing the format of the opposite sides of an insert which is a component of the second embodiment;

Figure 8:
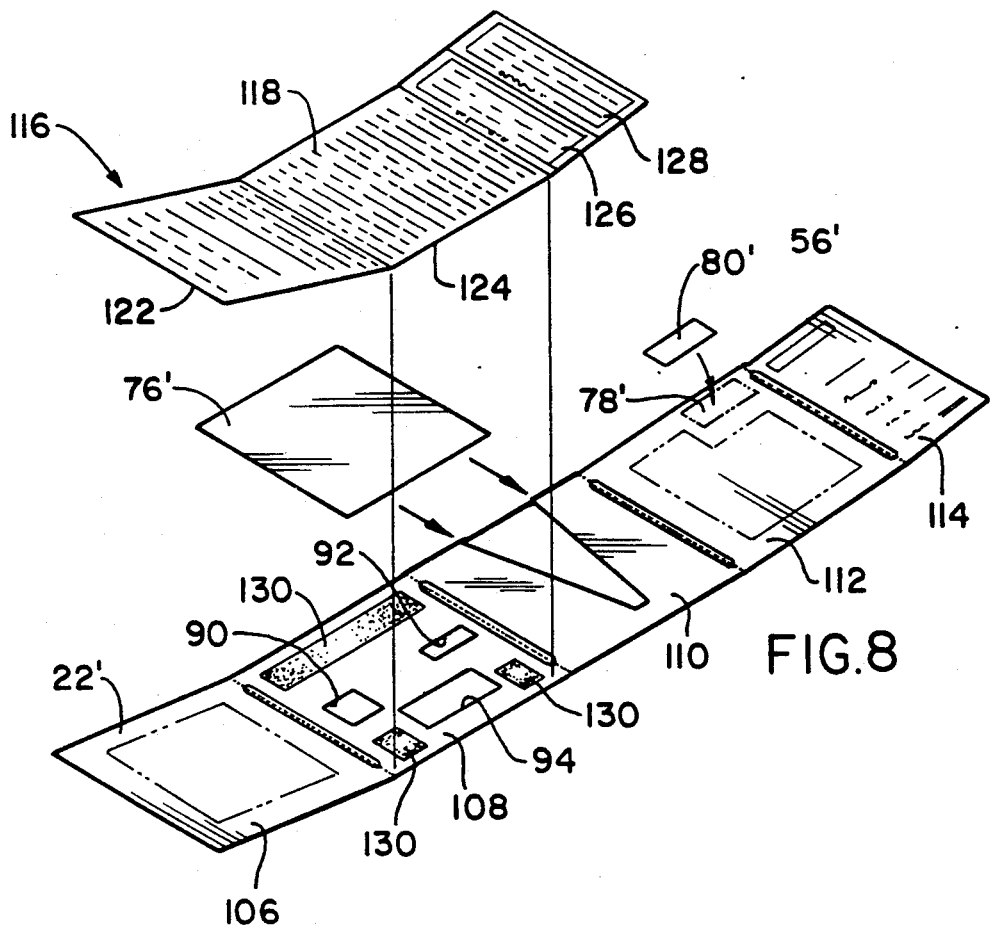
FIG. 8 is a perspective view, similar to FIG. 4, showing the final assembly stage resulting in the packet of the second embodiment.

A first embodiment of a transmittal package or packet 10 of the present invention is shown in its condition ready for mailing in FIG. 1. It will thus be understood that packet 10 has already been printed with a bulk postage symbol 12, with the sender's return address 14 and also prepared with the recipient's address label 16 adhered thereon, following which there is a final sealing of the packet within a plastic shrink wrap 18.

In its preferred contemplated commercial end use, packet 10 is designed to provide the recipient with a sample of a product selected for promotion, together with advertising and instructional information, a convenient order form and a postage paid reply mail envelope, all as will now be described and as is illustrated in FIGS. 2 through 5.

In FIG. 2, the packet is shown in its preliminary condition as a flat form or blank 20, with its printed side facing up and after die-cutting. Blank or form 20, rectangular in shape and made of pasteboard, is comprised of an "in" side 22 and an "out" side 24 to be folded about a central lengthwise fold line 26. A series of eight panels 28, 30, 32, 34, 36, 38, 40 and 42 are defined by three perforated lines designated respectively 44, 46 and 48, and each die cut in a perpendicular orientation relative to fold line 26. Between each of the adjacent panels 28 and 30, 30 and 32, and 32 and 34 an elongated fold relief slot 50 is provided, for a reason soon to be explained. Panel 30 includes a semi-circular notch 51 to advantageously display and make accessible the product 76 being mailed. The opposite edges of the end panels 34 and 42 are cut with a small offset 52. Panels 28, 30, 32 and 36 are usually imprinted with advertising text and graphics 54 rather than left blank, while panels 34 and 42 are always printed to function as an order form 56. Panel 38 is reserved for the recipient's address label 12 and panel 40 is imprinted with a business reply mail format 58.

Form 20 is shown in FIG. 3 at an assembly stage after glue 60 has been applied to designated areas 62, 64, 66 and 68 on its unprinted side as a flat die cut blank. Next, the "in" side 22 is folded against the "out" side 24 about fold line 26, and held together by the glue areas 62, 64, 66 and 68.

After the gluing, the assembled packet 10 is shown in FIG. 4 with the "in" side 22 face up, and with four delineated sections 69, 70, 72 and 74. More particularly: Section 69 is comprised of panels 28 and 36 with advertising 54; section 70 is comprised of panels 30 and 38 and in their superposed relation forms a pocket therebetween to receive the sample product 76; section 72 is comprised of panels 32 and 40 and functions as a business reply mail envelope; and end panels 34 and 42 cooperate to make up the order form section 56. On panel 32 of envelope 72 space 78 is allotted for a removable security seal 80.

In use, the product distributor arranges the assembly sequence such that the product 76 is first inserted within pocket 70, seal 80 is applied at 78, and the recipient's address label 12 secured to panel 38. Packet 10 is then folded as indicated in FIG. 5, before final sealing with a clear plastic shrink wrap 18.

The just described first embodiment packet 10 is designed for the transmission of a word processor diskette 76. Diskette 76 is typically flat, round and sized to fit its respective pocket 70, but the product being sampled to the customer-recipient may also be a flat plastic-encased face cream sample, a perfume sample, a medical specimen, or the like.

Upon receipt of packet 10, the recipient removes wrap 18 and unfolds the packet. After studying the related product literature and examining the product to his or her satisfaction, the recipient may decide to order by mail rather than by telephone. To specifically accommodate this option, packet 10 can be separated into its four sections 69, 70, 72 and 74 along perforated lines 44, 46 and 48. Order form 56 is filled out and easily inserted within envelope 72 with payment documentation, and the inserted materials secured with seal member 80. It will be noted that the offset cut provided on order form 56 facilitates its disposition within envelope section 72, which section is now ready for return by mail to the manufacturer (see FIG. 13).

Detached section 70 can be used as a file folder for delicate items 76 that need to be protected and/or filed in sequence. Section 68 may be discarded or retained for subsequent reference to the information thereon.

Underlying the present invention is the providing of at least one compartment, such as is exemplified by section 72 comprised of the panels 30 and 38 in superposed or overlying relation with each other, that is readily detached from the packet 10. This results from notching, as at 50, the opposite sides of the top panel 30, and only perforating the opposite sides, as at 44 and 46, of the bottom panel 38. Thus, only one ply of perforations needs to be ruptured to release the section 72 from the packet 10, even though two plies of construction material cooperate to form a transmittal compartment in this section. In the first packet embodiment, all sections 69, 70 and 74, in addition to section 72, are readily detached from the packet 10 because of the use of cooperating notches 50 and underlying lines of perforations 44, 46 and 48.

The inventive concept of cooperating notches 50 and lines of perforations to facilitate detachment of two ply compartments as just noted, is, of course, readily embodied in other versions of packets. For completeness' sake, another version of packet, featuring personalizing the references to the recipient, will now be described in specific reference to FIGS. 6-12. In FIGS. 6-12, structural features already described in connection with the first packet embodiment of FIGS. 1-5 will be designated by the same, but primed, reference numerals.

In FIG. 6 the flat form 20' for a packet 10' is illustrated with its printed side facing up and after die-cutting. Form 20' is comprised of an "in" side 22' and an "out" side 24' to be folded about the lengthwise centrally located fold line 26'. Like flat form 20, form 20' has cooperating pairs of panels 28' and 30', 32' and 34', 36' and 38', and 40' and 42', and also additional panels 82 and 84. Panels in form 20' are defined by fold line 26' and four perforated lines denoted 44', 46', 48' and 86 which are diecut perpendicular to fold line 26'. Between panels 82 and 28' an additional fold relief slot 87 is added, while panels 28' and 30', 30' and 32' and 32' and 34' have fold relief slots 50'. Panel 30' may be provided with one or more notches 51 for product display, and order form panels 34' and 42' are cut with an offset 52'. Panels 82, 30', 32', 84 and 38', if not left blank, are provided with advertising graphics and text 54', while panels 34' and 42' are printed to serve as an order form 56'. Panel 40' is impressed with a business reply mail format 58'.

As described at this point, flat form 20' is similar to form 20 except for the addition of a pair of panels 82 and 84 and a pair of aperture groups 88 on panels 28' and 36' symmetrically located about fold line 26'.

Form 20' is shown in FIG. 7 after glue patches 60' have been applied to five specific areas 96, 98, 100, 102 and 104 on the unprinted side. The "in" side 22' is then folded against the "out" side 24' about fold line 26'.

In FIG. 8, after glue 60' has set, packet 10' is shown with the "in" side 22' face up and having five definitive sections 106, 108, 110, 112 and 114. Section 106 is made up of panels 82 and 84 with advertising 54', and panels 28' and 36' form address section 108 in conjunction with insert 116 to be described. Product pocket section 110 is formed between panels 30' and 38', and similar panels 32' and 40' make up business reply mail envelope section 112, and order form 56' section 114 is made of panels 34' and 42'. On panel 32' of envelope 112 a space 78' is reserved for a removable security seal 80'.

After assembly as shown in FIG. 7, the aligned apertures 90, 92 and 94 become respectively an opening to display the bulk mail symbol 12', a display window for the sender's return address 14', and a window for the recipient's address 16'. Items 12', 14' and 16' are imprinted on an insert 116 now to be described in connection with FIGS. 8, 9 and 10.

Like forms 20 and 20' insert 116 has an "in" side 118 (FIG. 9) and an "out" side 120 (FIG. 10). The format for insert 116 is prepared on letter paper by laser printing or otherwise with the recipient's name repeated several times in the text of a "personalized" letter section 122. Items 12', 14' and 16' are imprinted on section 124 at locations selected to register with openings 90, 92 and 94. Sections 126 and 128 can be printed as "cut off" bonus or discount coupons that are numerically coded and can be utilized by the recipient as instructed when ordering additional product 76'. The side 118 of insert 116 can be printed with advertising, instructions or the like and constitute the reverse of coupons 126 and 128.

Figure 11:
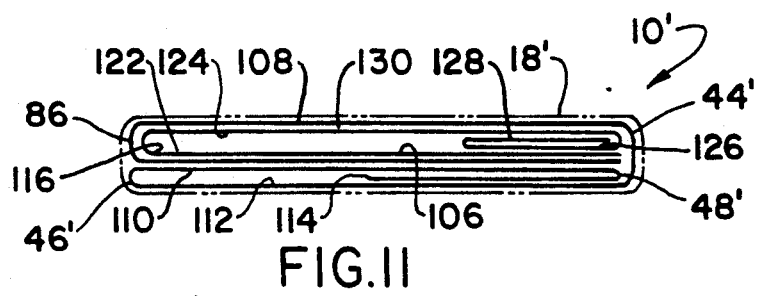
FIG. 11 is a schematic top plan view of the packet projected from FIG. 12.

At final assembly of packet 10', the personalized letter insert 116 is folded (see FIG. 11) and adhered to panel 28' at section 108 thereof after glue pattern 130 has been applied thereon. Proper orientation and location of insert 116 insures that items 12', 14' and 16' will be properly registered and perceived through apertures 88. Product 76' is inserted within section 110 and security seal 80' is applied at 78'. Completed packet 10' is now folded as shown in FIG. 11 and sealed within a clear plastic shrink wrap 18' (see FIG. 12).

Figures 12, 13, 14:
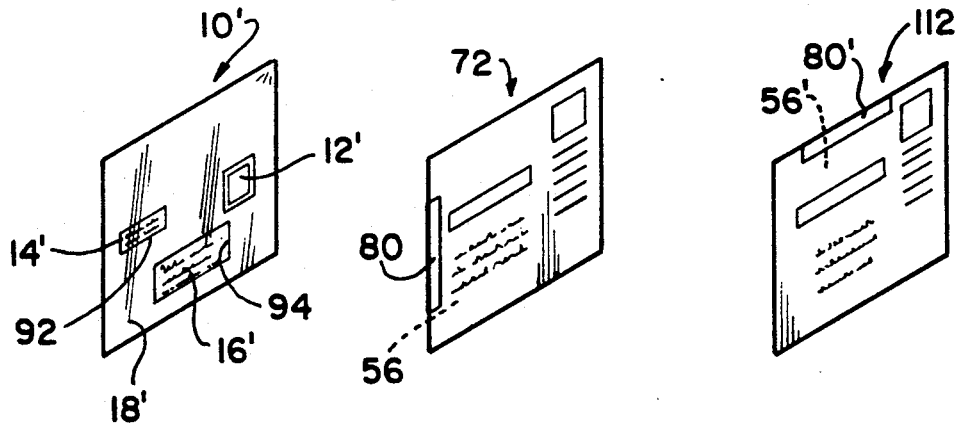
FIG. 12 is a front perspective view of the second embodiment packet completely assembled preparatory to mailing.
FIGS. 13 and 14 are, respectively, perspective views of the response envelope component of the first and second packet embodiments.

In a view similar to FIG. 1, packet 10' in FIG. 12 is shown as delivered to the recipient wherein postage symbol 12', the sender's return address 14' and recipient's address 16' are visible through respective apertures 90, 92 and 94, and the whole of packet 10' being well protected during transit by the shrink wrap 18'.

The processing of the packet 10' by the recipient, and particularly the ready detachment therefrom of the sections along the aligning line of perforations 86 and notch 87, line 44 and notch 50', line 46' and notch 50', and line 48' and notch 50', as best shown in FIG. 6, will be understood to be similar to that already described in connection with packet 10, and thus will not be repeated for brevity's sake, and as unnecessary for an understanding of the present invention.

While the embodiments of transmittal packages or packets herein shown and disclosed in detail are fully capable of attaining the objects and providing the advantages hereinbefore stated, it is to be understood that they are merely illustrative of the presently preferred embodiments of the invention and that no limitations are intended to the detail of construction or design herein shown other than as defined in the appended claims.

What is claimed is:

1. A transmittal package for a return order form comprising a blank of rectangular shape having a cooperating pair of interconnected elongated top and bottom panels delineated from each other along a fold line located centrally of and lengthwise of said blank so that said bottom panel is foldable over said top panel to form at least one compartment therebetween, at least two lines of perforations at two spaced locations in said top panel oriented widthwise thereof and defining therebetween a compartment for a return order form between said spaced lines of perforations, and a slot at two locations in said bottom panel oriented widthwise thereof and adapted to align with a cooperating one said line of perforations in said top panel so that the separation of said compartment formed by said top and bottom panels from said blank is along said lines of perforations in only said top panel although said bottom panel is in covering relation therewith, whereby said separated compartment is adapted to serve as a transmittal package for an order form.

* * * * *